(Model.)

A. C. HAFELY.
Lead and Crayon Holder.

No. 232,607.  Patented Sept. 28, 1880.

WITNESSES:
Edward R. Brevoort
W. L. Bennem

INVENTOR:
Alfred C. Hafely,
BY Phillips Abbott,
his ATTORNEY.

UNITED STATES PATENT OFFICE.

ALFRED C. HAFELY, OF NEW YORK, ASSIGNOR TO WILLIAM C. HORN, OF BROOKLYN, N. Y.

LEAD AND CRAYON HOLDER.

SPECIFICATION forming part of Letters Patent No. 232,607, dated September 28, 1880.

Application filed July 31, 1880. (Model.)

*To all whom it may concern:*

Be it known that I, ALFRED C. HAFELY, of the city of New York, in the county and State of New York, have invented a new and useful Improvement in Lead and Crayon Holders, of which the following is a full, clear, and exact description, reference being had to the accompanying drawings, in which—

Figure 1:
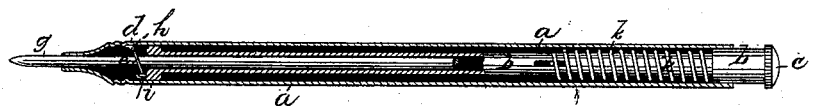
Figure 2:
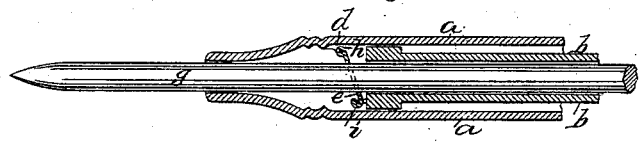

Figure 1 shows a vertical section of the pencil; Fig. 2, an enlarged figure of the holding-disk, lead, and end of the inner tube, and Fig. 3 a view of the disk.

Prior to my invention many devices have been used in lead-pencils of the kind in which the lead is movable for holding the lead and projecting it from and retracting it into the handle or tube of the pencil, and my invention relates to an improvement in this class of pencils, and is as follows:

In Fig. 1, $a$ shows the outer tube or handle of the pencil, made tapering at one end to form the point, as is usual, and in this point is the hole from which the lead projects. Within this tube is another one, (seen at $b$, Figs. 1 and 2.) This inside tube is concentric with the outer one, and is made so much smaller that it will easily slide in and out of the outer one. This inner tube has a head or knob, $c$, on the end of it to give it a handsome finished appearance, and it is not quite so long as the outer tube.

Figure 3:

At the point $d$, Figs. 1 and 2, of the outer tube, where it begins to taper to form the point, and on the inside of the tube, I introduce an elliptically-shaped disk, of metal or other suitable material, (shown at $e$,) not quite so large in its longest dimension as the inside diameter or bore of the outer tube, and through this disk is made a hole, $f$, Fig. 3, somewhat larger than the size of the lead to be used in the pencil, so that the lead will easily drop through this hole by gravity alone. When held perpendicularly the lead is seen at $g$. The hole in the disk may be made in one side of it, if desired. This disk is fastened to the inside of the outer tube at the point $d$ by a hinge-like connection, $h$, between one of the ends of the disk and the wall of the tube, so that it can swing in the tube as a valve swings; and to enable it to do this the disk must be elliptical in form, as seen in Fig. 3, for, if not, when swung it will hit the sides of the tube. It may, however, be perfectly round if it be made considerably smaller than the bore of the tube; or it may be made in the form of link or ring, either flattened or round, if small enough to swing in the tube.

There is another hinge-like connection (seen at $i$) between this disk and the end of the inner tube, which tube is made long enough to come up to and just touch the disk when it lies squarely across the axial line of the tubes, and yet extend a trifle beyond the end of the outer tube, as hereinafter stated. It may be made somewhat longer, if desired. This second hinge-like connection is made at the end of the disk which is opposite the like connection with the side of the outer tube, and a coiled spring, $k$, placed within the outer tube, (which spring is attached in any suitable known manner,) causes the inside tube always to assume a position of projection from the outside tube as far as the connections between the disk and the two tubes will allow it to go, and the disk, by the action of this spring, conveyed to it by the inside tube and the hinge-like connections, always assumes a position at an oblique angle to the axial line of the tubes, as seen in Figs. 1 and 2. There must be a stop provided either by a shoulder on the projecting end of the inner tube or at some other suitable place, so that the inner tube cannot be pressed into the outer one any farther than sufficient to cause the disk to assume a position at right angles to the axial line of the tubes, for otherwise the disk may be thrown over when the end of the pencil is forced in quickly and sharply, either by a rap on the disk or otherwise, and the lead be broken. The disk, being hung and connected as shown, forms the stop itself in this instance.

The operation of my improved pencil is as follows: The inner tube is made to slip into the outer one by pressure applied to its exposed end, whereby the spring is compressed and the disk is made to assume a position at right angles to and squarely across the axial line of the tubes. The center of the hole in the disk will then be directly in line with the axis of the tubes and with the center of the hole at the point of the pencil. The lead may then be dropped into this hole in the point of the pencil, thence it will pass through the hole in the disk, and thence into the hole or bore of the inner tube behind the disk. The moment the pressure is removed from the end of the inner tube the spring acts to throw it out of the outer one, and thus, by the action of the hinge-like connections, the disk is made to assume a position at an oblique angle to the axial line of the tubes, as seen in Figs. 1 and 2, and binds the lead between the sides of the hole in the disk. As the disk swings, the lead being meantime confined by the tubes, the hole in it is practically narrowed or made smaller until it is not large enough to allow the lead to pass through it, and it then binds on the lead and holds it, and the more pressure there is applied to the lead from the point the more the disk binds and firmly holds the lead. The lead will thus be confined at any position in which it happens to be when the pressure on the end of the inner tube is relieved, and, on the contrary, when the inner tube is pressed in and the disk assumes its position at right angles to the axial line of the tubes the lead will drop in and out of the pencil by gravity alone. Thus, when the pencil is to be used the lead may be made to project more or less from the point of the pencil, at the will of the user, and when not in use the lead may be dropped entirely within the tubes for protection by simply tapping the end of the pencil on the table or by pressing in the tube in any other manner.

The connection between the inside of the outer tube and the disk, and that between the disk and the end of the inner tube, need not be regular hinge-joints, because any method of connecting these parts so that they shall be capable of a swinging motion will suffice, such as a ball-and-socket joint, a thumb and link, or, in the case of the connection between the disk and the outer tube, a curved hook-like projection from the end of the disk may engage in a loop or its equivalent in the side of the outer tube; also, the disk may be hung to the outer tube on two pivots and swing on them. As a substitute for either of these connections, and instead of the inner tube, a single or double rod may be used to connect the spring and the disk; but the tube is better, because it more accurately controls the lead and guides it directly to the hole in the disk should it be so short as to drop entirely past the disk into the inner tube when retracted for protection.

Having thus described my invention, what I claim is—

1. The combination, substantially as before set forth, of a pencil-tube, a perforated disk hung therein, and means causing the disk to automatically bind on a lead extending through its hole.

2. In a pencil or similar utensil, the combination of a swinging disk, a spring, and a connecting means between the disk and the spring, substantially as and for the purposes set forth.

3. In a pencil or similar utensil, the combination of an outer tube, a swinging disk, an inner tube, and a spring, substantially as and for the purposes set forth.

4. In a pencil or similar utensil, the combination of an outer tube, a swinging disk, a spring, and a connecting means between the disk and the spring, substantially as and for the purposes set forth.

In testimony whereof I have hereunto set my hand at the city of New York this 29th day of July, 1880, in the presence of two subscribing witnesses.

ALFRED C. HAFELY.

Witnesses:
 BARON HIGHAM,
 PHILLIPS ABBOTT.